(12) United States Patent
Kopp

(10) Patent No.: US 6,725,887 B2
(45) Date of Patent: Apr. 27, 2004

(54) PROCESS FOR FILLING A MIXTURE OF AT LEAST TWO MONOMERIC AND/OR OLIGOMERIC COMPONENTS INTO A CONTAINER

(75) Inventor: Volker Kopp, Esslingen (DE)

(73) Assignee: C. Ehrensperger AG, Stafa (CH)

( * ) Notice: Subject to any disclaimer, the term of this patent is extended or adjusted under 35 U.S.C. 154(b) by 22 days.

(21) Appl. No.: 10/011,367

(22) Filed: Nov. 4, 2001

(65) Prior Publication Data

US 2003/0164201 A1 Sep. 4, 2003

(30) Foreign Application Priority Data

Nov. 17, 2000 (DE) .......................................... 100 57 332

(51) Int. Cl.[7] ............... B65B 1/04; B65B 3/04
(52) U.S. Cl. ............... 141/9; 141/20; 141/24; 141/100; 141/105; 141/313
(58) Field of Search ............... 141/3, 9, 11, 20, 141/24, 69, 70, 83, 100–107, 114, 313

(56) References Cited

U.S. PATENT DOCUMENTS

| 4,913,197 A | * | 4/1990 | Friedrich ........................ 141/3 |
| 6,085,945 A | * | 7/2000 | Fransen .................. 222/402.18 |
| 6,186,193 B1 | * | 2/2001 | Phallen et al. ................. 141/83 |

* cited by examiner

*Primary Examiner*—Timothy L. Maust

(57) ABSTRACT

A process for filling a mixture of at least two components selected from monomeric and oligomeric components into a container, which mixture, after discharge from the container, polymerizes with at least partial volume increase, comprising a mixing zone to which the at least two components to be mixed are fed, the at least two components being mixed under pressure in the mixing zone and the mixture under pressure being filled into the container.

17 Claims, 2 Drawing Sheets

PROCESS FOR FILLING A MIXTURE OF AT LEAST TWO MONOMERIC AND/OR OLIGOMERIC COMPONENTS INTO A CONTAINER

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a process for filling a mixture of at least two monomeric and/or oligomeric components into a container, which mixture, after discharge from the container, polymerizes with at least partial volume increase, and a container containing a mixture filled under pressure and consisting of at least two monomeric and/or oligomeric components.

TECHNICAL FIELD

Polyurethane foams are widely used. Polyurethane foams are used in particular in the building industry, for example as insulating material or sealing material for windows and doors. The foam components required for this purpose are provided in containers or cans. Before the polyurethane foam is discharged, it is necessary to mix the components of the can thoroughly by shaking since the individual components, such as, for example, polyol, isocyanate and the blowing gases and additives, are present separately in the can under pressure. Only after thorough mixing of the components is it possible to discharge the polyurethane foam, which expands and cures after discharge. In addition, such containers have the disadvantage that, right at the beginning or after slight emptying, only overhead work is possible for further discharge of the polyurethane foam, i.e. the container must be held with the discharge valve pointing downwards in order to discharge the foam. This makes it considerably more difficult to carry out the activity. A further substantial disadvantage of these sales units is that a considerable proportion of polyol and isocyanate remains in the can and can no longer be discharged because the blowing gas has already been consumed. Consequently, the consumer can process only ¾ of the amount of polyurethane foam purchased. Furthermore, owing to the only partial emptying, the toxic component isocyanate remains in the container so that the disposal of such cans is complicated and expensive and gives rise to environmental pollution.

SUMMARY OF THE INVENTION

It is therefore the object of the invention to provide a process for filling a mixture of at least two components into a container, which mixture, after discharge, polymerizes with at least partial volume increase, and a container containing a mixture filled under pressure, so that virtually complete discharge of the medium from the container is permitted.

This object is achieved by a process for filling a mixture of at least two monomeric and/or oligomeric components into a container, which mixture, after discharge from the container, polymerizes with at least partial volume increase, comprising the following steps: feeding the at least two components to be mixed to a mixing zone, mixing the at least two components under pressure in the mixing zone, and filling the mixture under pressure into an envelope in the container. This object is also achieved by a container for discharging a mixture of at least two monomeric and/or oligomeric components which, after discharge from the container, polymerize with at least partial volume increase, comprising an interior that is subjected to superatmospheric pressure, an envelope arranged in the interior, and a valve that clinches the bag to a container orifice in a medium-tight manner, wherein a mixture consisting of the at least two components is introduced under pressure into the envelope.

This process permits virtually complete emptying of an envelope provided in the container and intended for holding a mixture of at least two monomeric and/or oligomeric components. Surprisingly, it has been found that the mixture of these components is maintained under pressure and separation into the individual components does not take place. Consequently, uniform distribution of the at least two components can take place, resulting in virtually complete discharge. Furthermore, the mixture can surprisingly be kept in a liquid phase, with the result that discharge of the mixture is permitted even after prolonged storage, without polymerization taking place in the container.

This is particularly advantageous especially when filling the container with a polyurethane foam, since the component isocyanate is toxic and, as a result of the virtually complete discharge, simple and environmentally compatible disposal of such containers is ensured. Consequently, not only is the degree of use of the containers filled by the process considerably increased. In addition, the filling of containers by means of this process makes it possible to discharge the mixture consisting of at least two monomeric and/or oligomeric components in any desired position and location of the container. This leads to greater flexibility during use and to a simplification of discharge of the mixture, in particular of a polyurethane foam, which is preferably used in the building industry. A reduction in the time required for processing can thus be achieved.

According to a development of the process, it is intended that the mixing zone be in the form of a mixing container in which the components are subjected to at least a superatmospheric pressure which is such that the remaining mixture is kept in the liquid phase when a mixing container has been almost completely emptied. This makes it possible to suppress separation of the individual components, so that foaming of one of the components is also prevented. The superatmospheric pressure is such that the individual components of the mixture are always kept in the liquid phase, even when there is a pressure drop owing to virtually complete emptying of the mixing container.

As an alternative to a mixing container in the form of a mixing zone, it is also possible to provide a continuous homogenization zone or mixing zone which permits uniform thorough mixing with simultaneous or successive feeding of the individual components. Even in the case of continuous thorough mixing and removal of the mixture from the mixing zone, superatmospheric pressure which once again keeps the mixture in the liquid phase is built up owing to the amount of mixture to be removed in relation to the feed of the individual components.

According to a further development of the invention, it is intended that the mixing zone be cooled, preferably to a temperature of less than 50°, during the thorough mixing of the at least two components. As a result, so-called boiling of the components can be avoided. This is of particular importance especially with the use of polyurethane foam. As a result of the cooling, it is also possible to achieve uniform thorough mixing. The cooling of the mixture in the container and the magnitude of the superatmospheric pressure to be applied in the container are related to the components to be mixed. These parameters are set and tailored to one another in such a way that the mixture is removed in a liquid phase from the mixing zone.

According to a further development of the invention, it is intended that each of the at least two components is fed in succession to the mixing zone and a measurement of the quantity of the component fed in is carried out. By weighing the mixing container, the amount of the component fed in can be determined and also recorded. Thus, for example when a mixing container has a volume of 300 l, portioning of the respective components accurately to 100 g may be permitted, with the result that a very exact composition of the formulation is achieved. Consequently, the quality of the product to be discharged can be established exactly in its reaction after the discharge. The product quality is thus increased.

According to a further development of the invention, it is intended that complete thorough mixing of the components is effected in a first phase in the mixing zone and a calming phase is carried out thereafter. Owing to the thorough mixing with stirring tools or the like, preferably by means of a stirrer having one or more propellers, the small bubbles formed on the stirring tools during the thorough mixing can escape from the mixture and migrate, so that exclusively the mixture present in the liquid phase is filled into the container.

According to a further development of the invention, it is intended that the mixture be fed by a delivery pump to a filling station for portioning the amount to be filled. By means of the delivery pump, the pressure is maintained or increased and the prepared mixture is transferred under pressure to a filling head of the filling station for portioning of the amount to be filled. Advantageously, it can be ensured that further additives are also mixed in by means of the delivery pump.

This process according to the invention is used for filling components with the formation of a polyurethane foam into containers. In particular, the components polyol, isocyanate and various additives, such as, for example, flameproofing agents and anti-ageing agents, as well as various gases are advantageously used for this purpose. The use of compressed air as blowing gas is particularly advantageous since this is an environmentally friendly use of blowing gas.

Alternatively, further monomeric and/or oligomeric components which serve for the formation of foamed plastics can also be used. For example, polystyrene and styrene copolymers, rigid and flexible PVC, polycarbonates, polyolefins, polyisocyanurates, polycarbodiimides, polymethacrylates and polyamides are also suitable in addition to polyurethane for the preparation of foamed plastics.

The use of a container according to the invention makes it possible to keep the mixture in a liquid phase, preferably under pressure, during storage until use and, due to the superatmospheric pressure, permits virtually complete or complete discharge. The discharge can also be effected in all possible positions of the container.

DETAILED DESCRIPTION OF THE INVENTION

Figure 1:
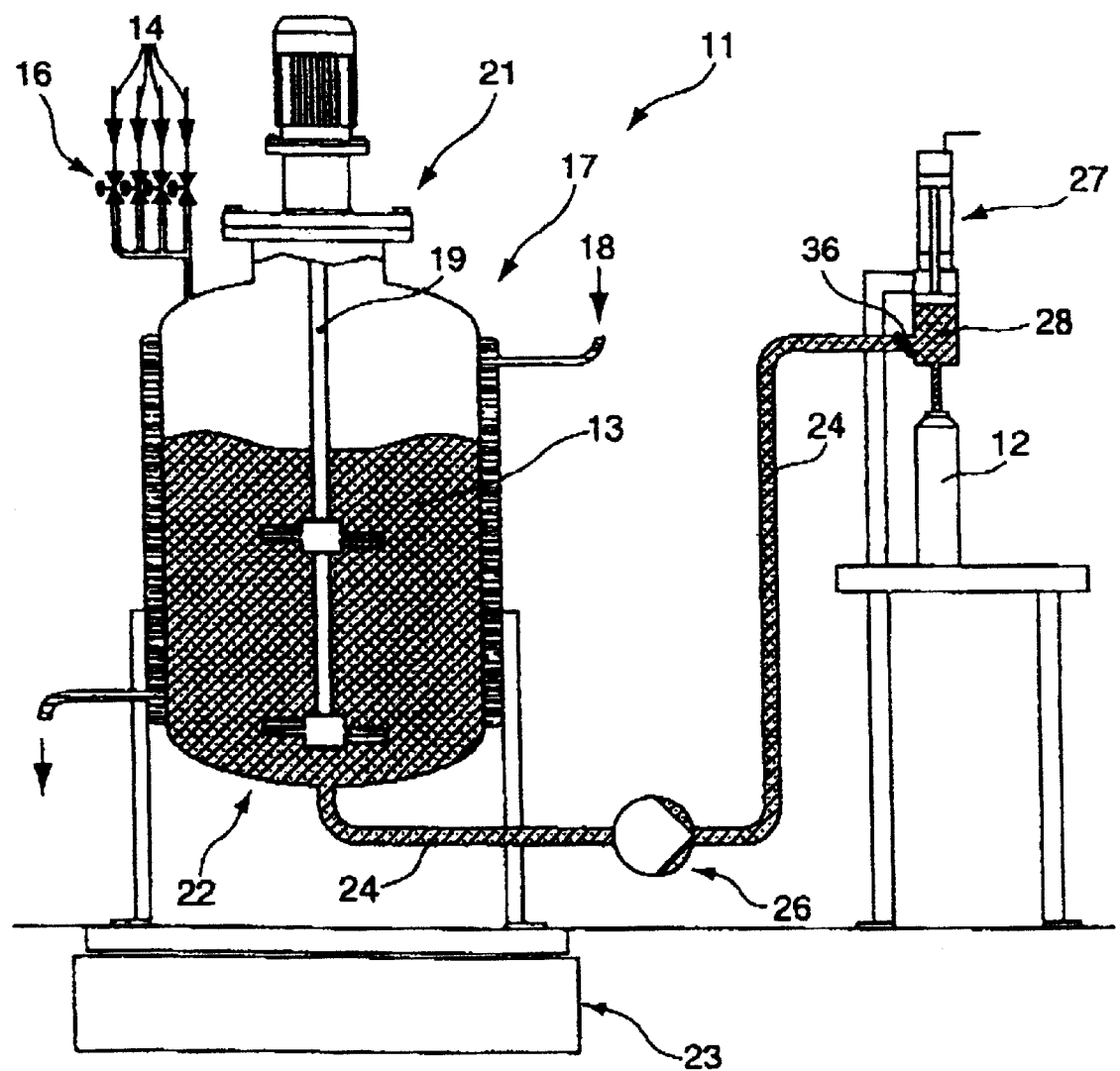
FIG. 1 shows a schematic diagram of a production plant for carrying out the process according to the invention and FIG. 2 shows a container filled by the process according to the invention and containing a mixture of at least two components, preferably polyurethane foam.

FIG. 1 schematically shows a production plant 11 for filling containers 12. The process for filling the containers 12, for example for the use of polyurethane foam, is described below. Of course, the production plant is not limited to the processing of polyurethane foam but is suitable for the use of a mixture of at least two monomeric and/or oligomeric components which, after discharge, polymerize or expand at least partially with volume increase.

A polyol, isocyanate, additives, such as flameproofing agents and anti-ageing agents or the like, and various gases as blowing gas, such as, for example, compressed air, are fed to a mixing zone 13 in the form of a mixing container via feed lines 14. The feed lines 14 have shut-off valves 16 and are each actuated for feeding in the individual components. The feed line 14 leads into an upper section 17 of the mixing container 13. This mixing container 13 has a cooling means 18 on its outer circumference. This cooling 18 can be effected, for example, by means of water or other cooling media, such as liquid nitrogen or the like, flowing through. The mixing zone 13 is provided with a stirring apparatus 19 which is fastened in a pressure-tight manner to the mixing container 13 via a flange connection 21. The stirring apparatus 19 is formed, for example, by a propeller stirrer which has a propeller in the lower section 22 of the mixing container 13. Moreover, further propellers may be provided in different planes.

The mixing container 13 is provided on a weigher 23. A measurement of the amount filled can thus be carried out after feeding of an individual component, with the result that an exact formulation is provided in the mixing container 13. Before being filled, the mixing container 13 is at, for example, ambient pressure. The pressure increases as a result of filling the components, so that superatmospheric pressure is generated inside the mixing container. If this superatmospheric pressure is not sufficient for maintaining the liquid phase of all components, further pressure is applied to the mixing container so that, for example, at least a pressure of 2 bar is provided. The individual components are advantageously fed to the mixing container 13 already in the liquid phase. In comparison with the prior art, when filling the container 12 with a polyurethane foam, the amount of blowing gas fed in is that which is required for the formation of small bubbles during discharge of the polyurethane foam. The introduction of an amount over and above this, as was required in the prior art, is not necessary.

The amount to be filled in the mixing container is such that a batch of containers 12 can be filled.

Figure 2:
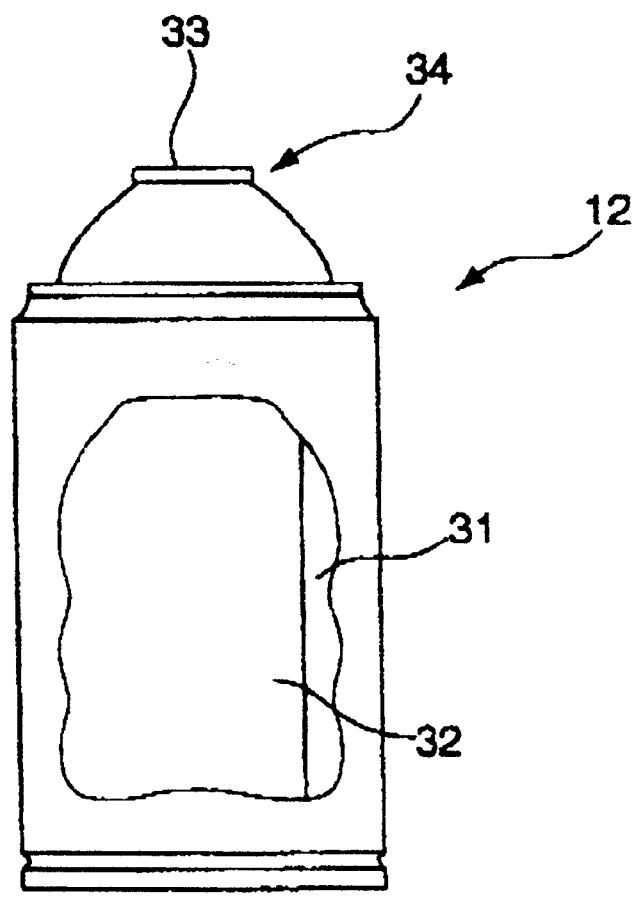

After the individual components have been introduced into the mixing container 13, rapid stirring by the stirring apparatus 19 is effected in a first phase so that complete thorough mixing of the individual components takes place. A calming phase is then initiated, in which the stirring tool stirs very slowly or is stationary. As a result, the small bubbles formed during stirring can escape from the mixture. The mixture under pressure is then fed from a lower section 22 of the mixing container 13 in a conveying line 24 via a delivery pump 26 to a filling station 27. The filling station 27 has a filling head 28, the volume of which corresponds to the amount of mixture to be filled into the container 12. The container 12 to be filled, which is shown in more detail in FIG. 2, has a bag 32 for holding the mixture in an interior 31. The interior 31 of the container 12 is under a superatmospheric pressure of, for example, up to 4 bar. After the insertion of the bag 32 into the interior 31, this superatmospheric pressure is introduced into the interior 31 of the container 12 via a bell, and a valve 33 is then clinched to a container orifice 34 so that the superatmospheric pressure is maintained in the interior 31.

When the container 12 is used for holding a mixture for discharging a polyurethane foam, a valve 33 which is in the form of an independently closing valve and seals the container gas-tight is preferably used. This valve 33 has a spring element which presses a closure part into a valve seat in a closed position, resulting in a gas-tight arrangement. The closure part has a sealing section having at least one elastically deformable, disc-like section which projects substantially radially from the closure part and rests with at least partial deformation against the valve seat. This embodiment permits gas-tight closure after filling, even after filling of the bag 32 or of the container 12 through the valve orifice with actuation of the closure part. A reliably operating valve 33 can be formed in particular by avoiding separate sealing members of elastomeric material or rubber, which, on contact with polyurethane foam, harden after a short time and hinder operation.

Furthermore, this valve has the advantage that the closure part has a cylindrical body having channel-like depressions along the body which is present in the valve seat so that, on actuation of the valve, there is an axial movement against a spring element. Consequently, tilt-free actuation of the valve for the introduction of the polyurethane foam into the bag or container 12 and the discharge of the polyurethane foam can be achieved.

Before the mixture is filled by means of the filling head 28 into the container 12 or into the bag 32 through the valve 33, the valve 33 is actuated briefly so that residual air in the bag 32 is completely released owing to the superatmospheric pressure in the interior 31 of the container 12. Thereafter, the mixture under pressure is filled into the completely emptied bag 32 via the filling head 28 while maintaining the pressure in the bag 32. The filling head 28 is in the form of a one-way cylinder. During the filling of the mixture, a nonreturn valve 36 closes the conveying line 24 which leads into the filling station 27. By applying pressure to the one-way cylinder, the mixture is filled into the bag 32 of the container 12. During this filling phase, the valve 33 is held in an open position and the mixture in the liquid phase is forced through the valve 33 into the bag 32. The pressure in the mixing zone can be maintained or increased. Owing to the pressure prevailing in the interior 31 as well as the mixture filled under pressure into the completely emptied bag 32, virtually complete emptying during the discharge of the polyurethane foam can be permitted. Furthermore, the liquid mixture under pressure in the bag 32 permits discharge of the polyurethane foam independently of the location and position of the container 12.

As an alternative to the batchwise filling of the mixing container, continuous provision of the mixture under pressure and comprising at least two components can also be implemented. For example flow meters which determine, check and record the amount of the component fed in can be provided in the feed lines. The mixing zone 13 is in the form of an inline homogenization apparatus or the like. The superatmospheric pressure in the mixing zone 13 is regulated by means of a delivery pump as a function of the amount delivered. By means of diffusers in a mixing zone, complete thorough mixing of the components can be ensured. Cooling can be effected analogously to the mixing zone 13 according to FIG. 1.

What is claimed is:

1. A process for filling a mixture of at least two components selected from monomeric and oligomeric components into a container, which mixture, after discharge from the container, polymerizes with at least partial volume increase, comprising the steps of:

feeding the at least two components to a mixing zone in a liquid phase, mixing the at least two components under pressure in the mixing zone, filling the mixture under pressure into an envelope provided in the container.

2. The process according to claim 1, further comprising feeding the mixture under pressure by a delivery pump from the mixing zone to a filling station, and filling a portion of the mixture into the container.

3. The process according to claim 1, further comprising using a mixing container for the mixing zone and subjecting the mixing container to at least superatmospheric pressure so that mixture remaining in the mixing container when the mixing container has been almost completely emptied is kept in a liquid phase.

4. The process according to claim 1, comprising feeding each of the at least two components in Succession to the mixing zone and measuring the quantity of the components fed to the mixing zone.

5. The process according to claim 4, comprising carrying out the quantity measurement by weighing.

6. The process according to claim 1, comprising mixing the at least two components completely and thoroughly in the mixing zone in a first phase and calming the liquid mixture in a second phase.

7. The process according to claim 1, comprising using a mixing container for the mixing zone, and thoroughly mixing the at least two components by a stirrer in the mixing container.

8. The process according to claim 1, comprising filling the mixture at least at slightly superatmospheric pressure into the envelope in the container, and keeping in the mixture in the container in a liquid phase.

9. The process according to claim 1, comprising feeding to the mixing zone an amount of the at Least two components of the mixture to fill a batch of containers.

10. The process according to claim 1, comprising continuously feeding a controlled amount of the mixture to the mixing zone for thorough mixing.

11. The process according to claim 1, further comprising using an envelope in the form of a bag arranged in the container, and subjecting the bag to a superatmospheric pressure prevailing in the interior of the container.

12. The process according to claim 1, further comprising emptying the envelope under pressure in the container completely by releasing residual air before being filled with the mixture under pressure.

13. The process according to claim 1, further comprising keeping a valve of the container depressed during the filling of the mixture, and filling the liquid mixture under pressure through the valve into the envelope.

14. The process according to claim 1, further comprising filling the mixture into the container while maintaining pressure in the mixing zone.

15. The process according to claim 1, further comprising feeding to the mixing zone at least the components polyol, isocyanate, additives and gases for the formation of polyurethane foams.

16. The process according to claim 15, further comprising feeding to the mixing zone compressed air as blowing gas.

17. A container for discharging a mixture of at least two components selected from monomeric and oligomeric components which, after discharge from the container, polymerize with at least partial volume increase, comprising a container interior that is subjected to superatmospheric pressure, an envelope in the form of a bag arranged in the container interior, and a valve that clinches the envelope to a container orifice in a medium-tight manner, wherein a mixture comprising at least two components is introduced under pressure into the envelope and wherein the envelope comprises a medium tight hag so that the mixture prepared by the process according to claim 1 is provided in a liquid phase into the envelope.

\* \* \* \* \*